(12) United States Patent
Kobayashi (10) Patent No.: US 7,457,056 B2
(45) Date of Patent: Nov. 25, 2008

(54) IMAGING SYSTEM

(75) Inventor: Futoshi Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 453 days.

(21) Appl. No.: 10/816,065

(22) Filed: Mar. 31, 2004

(65) Prior Publication Data
US 2004/0212720 A1    Oct. 28, 2004

(30) Foreign Application Priority Data
Apr. 22, 2003    (JP)    ............... 2003-116910

(51) Int. Cl.
*G02B 7/02*    (2006.01)
(52) U.S. Cl. .................. 359/811; 359/819; 359/822; 359/823
(58) Field of Classification Search .......... 359/811, 359/813, 815, 819, 821, 822, 823
See application file for complete search history.

(56) References Cited

U.S. PATENT DOCUMENTS

| | | | |
|---|---|---|---|
| 5,748,394 A | * | 5/1998 | Shimazaki et al. .......... 359/823 |
| 6,204,977 B1 | | 3/2001 | Iwasa |
| 6,599,035 B2 | * | 7/2003 | Ichinokawa .................. 396/349 |
| 2002/0141081 A1 | | 10/2002 | Onda |

FOREIGN PATENT DOCUMENTS

| | | | |
|---|---|---|---|
| JP | 11-231201 | | 8/1999 |
| JP | 02000194025 A | * | 7/2000 |
| JP | 02003274229 A | * | 3/2002 |
| JP | 2002-296480 | | 10/2002 |

* cited by examiner

*Primary Examiner*—Ricky L Mack
*Assistant Examiner*—Brandi N Thomas
(74) *Attorney, Agent, or Firm*—Canon USA Inc IP Div (57) ABSTRACT

An optical unit is transitional between a first mode for shooting and a second mode for non-shooting, and a supporting unit and a driving unit are located within a cylinder for substantially containing a tilting unit to be disposed about an optical axis as a center while are arranged so as to move together with a movable group and to avoid an imager and the retaining unit viewed from the optical axial direction.

2 Claims, 10 Drawing Sheets

IMAGING SYSTEM

BACKGROUND OF THE INVENTION

1. Field of the Invention

The present invention relates to an imaging system capable of receiving light.

2. Description of the Related Art

A collapsible lens-barrel of a taking lens has been known in which the entire length of the lens-barrel is changeable between a using mode where taking lenses are arranged at shooting intervals and a storing mode where the lens intervals and the space to an image pick-up surface are reduced. Changes in the entire length of the lens-barrel are established by a cam paying-out mechanism and a helicoid paying-out mechanism so as to have an appropriate arrangement of the lens-barrel. Also, a zoom lens-barrel may also be constructed in which a focal length is changed by independently moving two or more lens groups.

Figure 8:
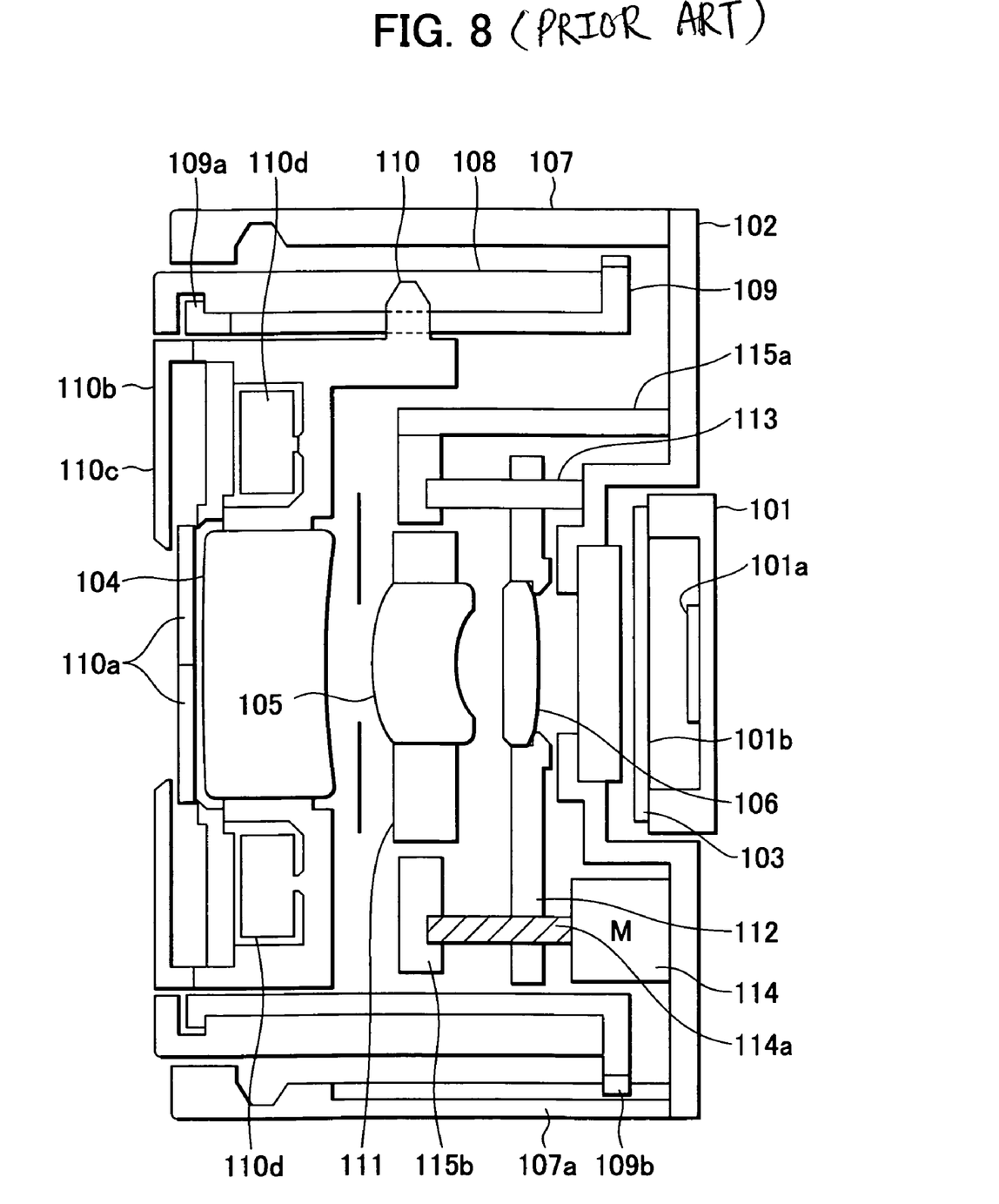
FIG. 8 is a lateral sectional view showing a collapsed mode of a conventional collapsible lens-barrel.

FIG. 8 is a lateral sectional view showing a collapsed mode of a conventional collapsible lens-barrel, wherein a CCD 101, which is an imager, includes an imaging surface 101a and a protection glass 101b. A CCD base board 102 retains the CCD 101 and components of the lens-barrel, which will be described later. An optical LPF (low pass filter) 103 prevents a luminance moiré and a false color using birefringence of crystal during shooting an object having a repetition pattern. A first group lens 104 constitutes an optical system of the conventional lens-barrel. Reference numeral 105 denotes a second group lens; and numeral 106 a third group lens in a similar way. In FIG. 8, each group lens is located at a stored position for non-shooting.

Figure 9:
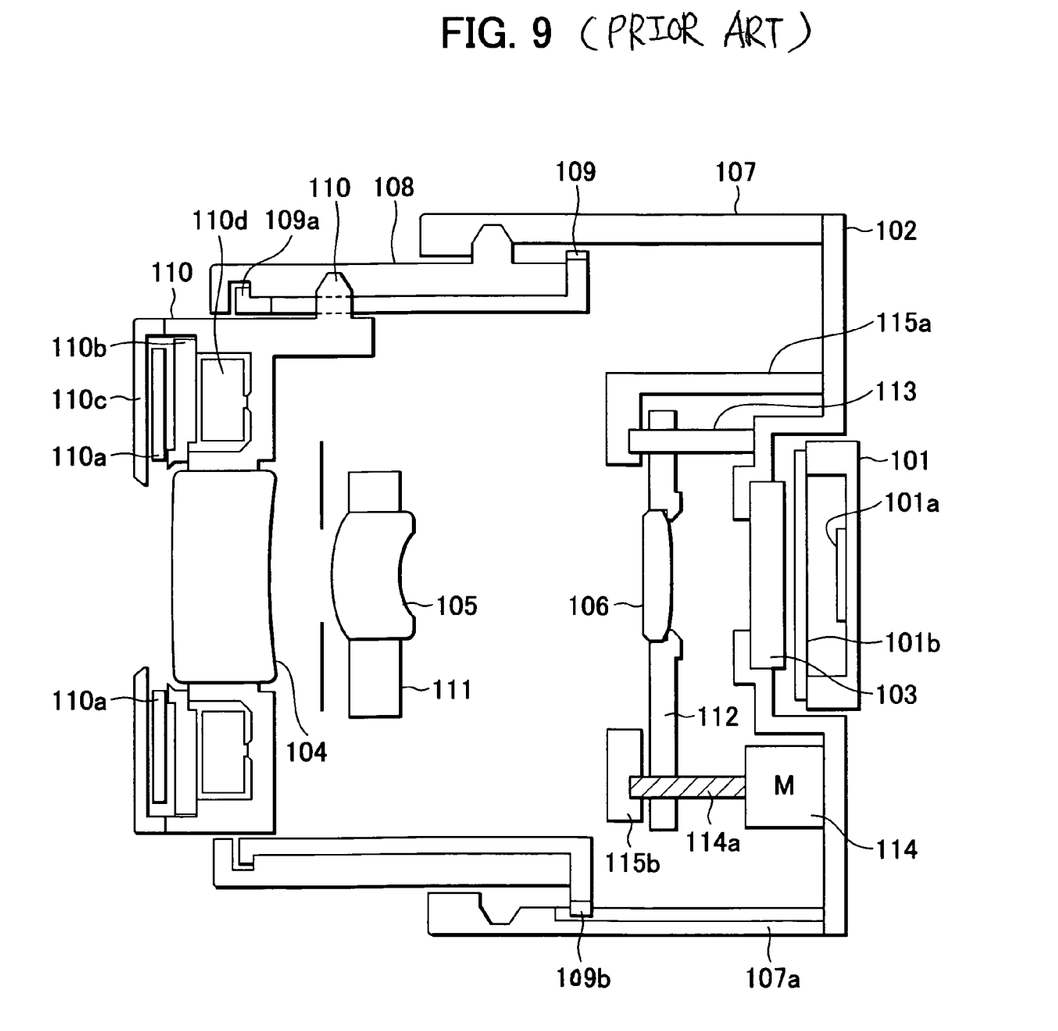
FIG. 9 is a lateral sectional view showing a service mode of the conventional collapsible lens-barrel.

FIG. 9 is a lateral sectional view of the lenses shown in FIG. 8 showing a service condition for shooting. A tubular fixed cylinder 107 is fixed to the CCD base board 102. A tubular cam cylinder 108 is provided with a projection formed on the external cylindrical surface so as to be a cam follower. The fixed cylinder 107 is provided with a cam formed inside so as to engage with the cam follower of the cam cylinder 108. The cam cylinder 108 can be rotated by a drive unit (not shown) so as to pay out toward an object while rotating by following the cam of the fixed cylinder 107.

A linear movement cylinder 109 is rotatably fitted with the internal surface of the cam cylinder 108. A claw 109a prevents the linear movement cylinder 109 from coming off the cam cylinder 108. A projection 109b radially extends from the linear movement cylinder 109. A groove 107a is formed on the internal surface of the fixed cylinder 107 in parallel with an optical axis. The projection 109b is fitted with the groove 107a so that the linear movement cylinder 109 is constructed to pay out without rotating by following the rotation paying-out of the cam cylinder 108.

A first group lens-barrel 110 retains the first group lens 104; and a first group cam follower is studded therein and directed outside the first group lens-barrel 110. The first group cam follower moves following a first group cam formed inside the cam cylinder 108. A second group lens-barrel 111 retains the second group lens 105. The second group lens-barrel 111 also has a second group cam follower studded therein and directed outside in the same way as in the first group lens-barrel 110 and moves following a second group cam formed inside the cam cylinder 108.

Furthermore, the linear movement cylinder 109 is provided with a cut-out formed in parallel with the optical axis, and the cut-out is fitted with the first-group cam follower for controlling the first group lens-barrel 110 so as to straight move, so that the first group lens-barrel 110 moves back and forth without rotation along the first group cam disposed in the cam cylinder 108 following the rotation of the cam cylinder 108. Similarly, the second group lens-barrel 111 is controlled so as to straight move by another cut-out formed in the linear movement cylinder 109 in parallel with the optical axis and fitted with the second-group cam follower so that the second group lens-barrel 111 moves back and forth without rotation along the second group cam disposed in the cam cylinder 108 following the rotation of the cam cylinder 108. Thereby, the first group lens-barrel 110 and the second group lens-barrel 111 are movable at positions for shooting. The lateral sectional view in FIG. 9 shows the positional arrangement of the conventional lens barrel, wherein the focal length is variable by appropriately changing the space between the first group lens 104 and the second group lens 105 with the cam of the cam cylinder 108.

A lens barrier 110a is for protecting lenses of the lens barrel in the storing mode; a barrier base board 110b includes a sliding surface of the lens barrier 110a; a barrier cap 10c is for preventing the lens barrier 110a from dropping off and for forming a movement space of the lens barrier 110a with the barrier base board 10b and the barrier cap 10c; and a barrier drive ring 10d is for closing the lens barrier 110a.

A third group lens-barrel 112 retains the third group lens 106 having a focusing function so as to move the third group lens-barrel 112 in an optical axial direction for focusing. A guide bar 113 is for supporting the third group lens-barrel 112 movably along the optical axis, and is studded in the CCD base board 102; a motor 114 for driving the third group lens-barrel 112 is fixed to the CCD base board 102; a screw 114a is rotated by the motor 114; a bearing 115a is for journaling the guide bar 113; and a bearing 115b is for journaling the screw 114a. Both the bearings 115a and 115b are fixed to the CCD base board 102. The third group lens-barrel 112 is provided with a nut screwed to the screw 114a and fixed not to be rotated, so that the third group lens-barrel 112 is back-and-forth driven by the motor 114, enabling focusing operation.

In a state that a signal produced from an image picking-up unit is not used for shooting, there may be a case where the entire lens-barrel length is reduced for improving the portability and reducing the storage space of an image picking-up apparatus. Therefore, in a collapsed mode of the lens-barrel, as shown in FIG. 8, the second group lens-barrel 111 may be stored so as to enter the movable range of the third group lens-barrel 112. In such a structure, in order to avoid components for moving the third group lens-barrel 112, such as the guide bar 113, the screw 114a, and their bearings 115a and 115b, the second group lens-barrel 111 must be largely cut out.

Figure 10:
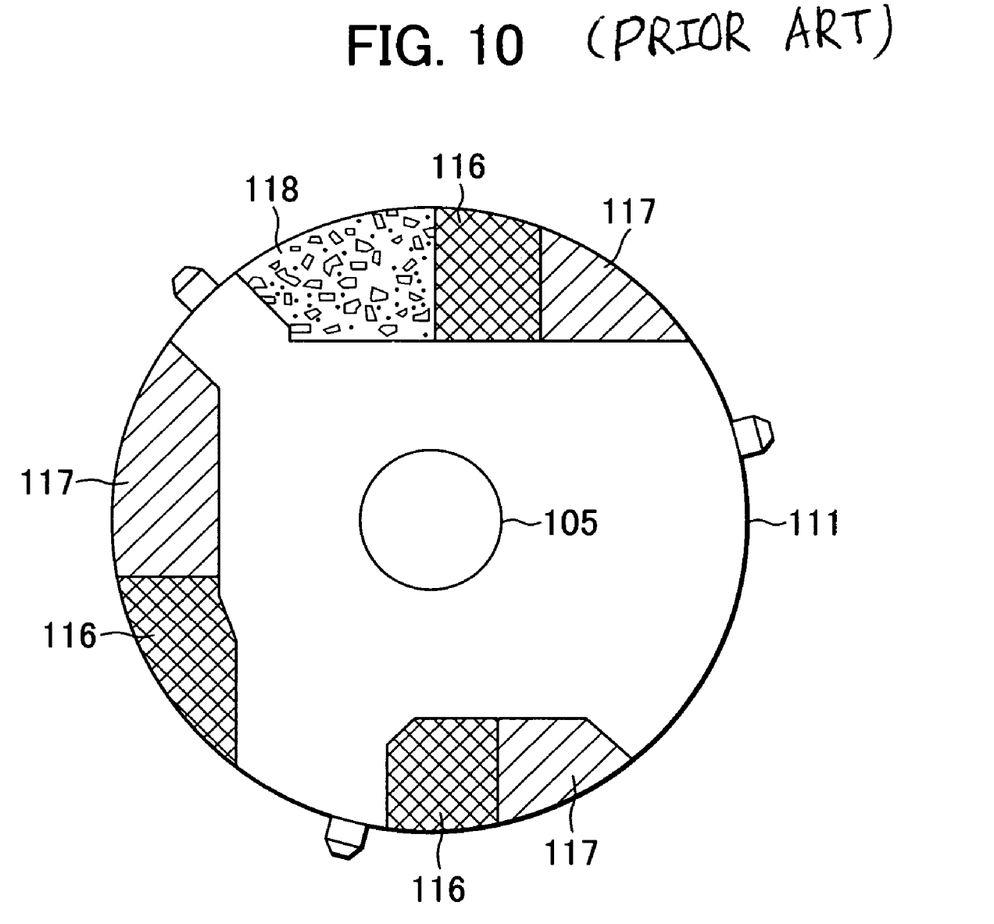
FIG. 10 is a front view of a second group lens-barrel of the conventional collapsible lens-barrel.

FIG. 10 is a front view of the second group lens-barrel 111, wherein reference numeral 116 denotes regions cut out of the second group lens-barrel 111 for avoiding the bearings 115a and 115b of the guide bar 113 and the screw 114a, and a bearing (not shown) for journaling a bar for suppressing the rotation of the third group lens-barrel 112 about the guide bar 113. Numeral 117 denotes regions cut out for avoiding the first group cam follower, three of which are arranged substantially at the same intervals. Numeral 118 denotes a cut-out region for driving the lens barrier for protecting lenses in a storing mode.

As described above, in the conventional second group lens-barrel 111, the area of the cut-out regions is so large that there have been problems of strength insufficiency and light leakage. The problem due to the strength insufficiency is instability in retaining lenses, leading to the deterioration of optical functions. The addition of ribs for ensuring a sufficient strength is against the miniaturization of the lens barrel, so that it is not meaningful to store the second group lens-barrel 111 so as to enter the movable range of the third group lens-barrel 112.

The light leakage is a phenomenon that light other than a luminous flux for shooting is picked up by the image picking-up means. In the conventional lens barrel, light entering the first group lens 104 at an angle and then reflected by the internal surface of the linear movement cylinder 109 may enter the CCD 101 without passing through the second group lens 105. However, since the second group lens-barrel 111 includes the large cut-out regions, such light leakage cannot be prevented, providing challenges to the miniaturization of the lens-barrel.

SUMMARY OF THE INVENTION

In order to solve the problems described above, it is an object of the present invention to provide an arrangement of elements in a lens-barrel so as to reduce the entire length of the lens-barrel without increasing the diameter of the lens-barrel.

In order to solve the problems described above, an imaging system according to the present invention includes image picking-up means for producing a signal by receiving light from an object; first retaining means for retaining the image picking-up means; and optical means for focusing an object image on the image picking-up means, the optical means including a movable group; second retaining means for retaining a second lens; supporting means for movably supporting the second retaining means; and driving means for driving the second retaining means, wherein the optical means is transitional between a fist mode for shooting and a second mode for non-shooting, and the supporting means and the driving means are located within a cylinder for substantially containing tilting means to dispose about an optical axis while are arranged so as to move together with the movable group and to avoid the image picking-up means and the imaging-system retaining means viewed from the optical axial direction.

Further objects, features and advantages of the present invention will become apparent from the following description of the preferred embodiments with reference to the attached drawings.

DESCRIPTION OF THE PREFERRED EMBODIMENTS

Figure 1:
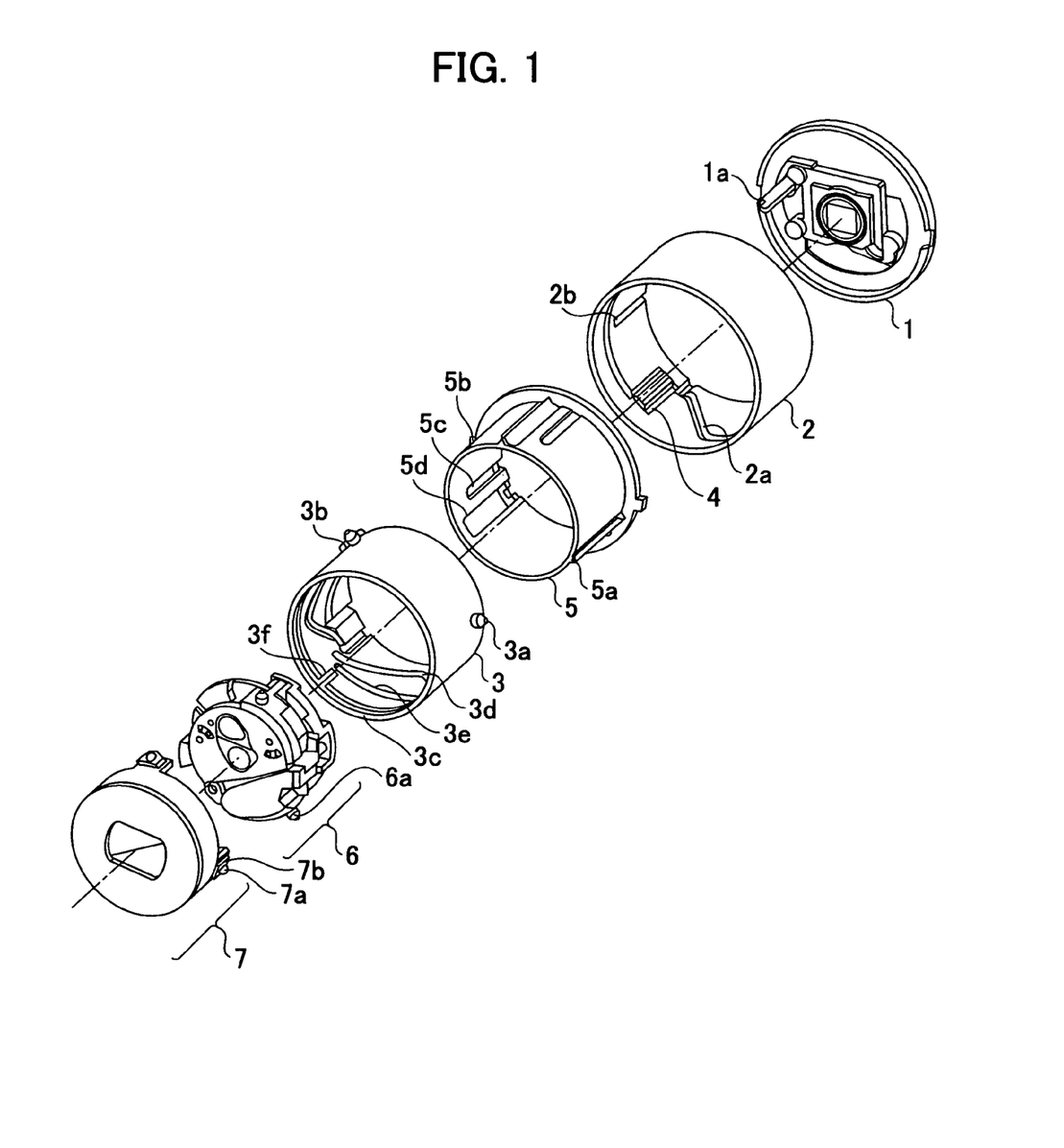
FIG. 1 is an exploded perspective view of a lens-barrel according to an embodiment.

FIG. 1 is an exploded perspective view of a lens barrel according to an embodiment of the present invention. An optical system according to the embodiment includes a compensator as a first group lens, a variator as a second group lens, and a focus lens as a third group lens. In the description below, the first group lens is retained in a first group lens-barrel, and similarly, the second group lens in a second group lens-barrel; and the third group lens in a third group lens-barrel.

A CCD base board 1 retains a CCD 31, which will be described later. A tubular fixed cylinder 2 is fixed to the CCD base board 1. Paying-out cams 2a are arranged at three points on the internal surface of the fixed cylinder 2 at equal intervals in the same shape.

A tubular cam cylinder 3 is provided with a paying-out cam follower 3a, which is engaged with the paying-out cams 2a, formed outside the cylinder. A cam cylinder gear 3b is arranged on part of the external surface of the cam cylinder 3. A drive gear 4 is rotated by a motor (not shown) so as to transmit the rotational force to the cam cylinder 3 by engaging with the cam cylinder gear 3b.

The paying-out and putting-in operations of the cam cylinder 3 will be described. A rotational force is transferred to the cam cylinder 3 by the drive gear 4, so that the rotating cam cylinder 3 is payed-out relative to the fixed cylinder 2 by the paying-out cam follower 3a following the paying-out cams 2a. When the cam cylinder 3 is put in, the rotational direction of the drive gear 4 may be reversed. The position of the cam cylinder 3 is detected by detecting means (not shown) so as not only to prevent the excessive paying-out or putting-in but also to stop the cam cylinder 3 at a predetermined position. As for the detecting means, there may be methods such as a method detecting the number of motor revolution and a method for detecting the position of the cam cylinder 3 by a variable resistor; however, the method is not specifically limited here.

A tubular linear movement cylinder 5 is fitted with the internal surface of the cam cylinder 3. A coming-off prevention key 5a is engaged with a groove 3c formed on the internal surface of the cam cylinder 3 in a ring shape so as to prevent the linear movement cylinder 5 from coming off the cam cylinder 3. A linear movement key 5b is engaged with a groove 2b formed on the internal surface of the fixed cylinder 2 in parallel with the central axis of the fixed cylinder 2.

The operation of the linear movement cylinder 5 will be described. As mentioned above, the cam cylinder 3 is payed out while rotating; at this time, the linear movement cylinder 5 can be payed out by the cam cylinder 3 pulling the linear movement cylinder 5 by the coming-off prevention key 5a without rotation relative to the fixed cylinder 2 due to the linear movement key 5b. That is, the linear movement cylinder 5 is constructed only to linearly move in parallel with the central axis of the fixed cylinder 2.

Returning back to the cam cylinder 3, cams 3d and 3e are arranged on the internal surface of the cam cylinder 3, three of each being formed at three circumferential positions at equal intervals in the same shape. A second group cam 3d moves a second group lens-barrel unit 6, which will be described later, and similarly a first group cam 3e moves a first group lens-barrel unit 7. A connection groove 3f connects a nonuse region of the first group cam 3e to the groove 3c. When the cam cylinder 3 is combined with the linear movement cylinder 5, the coming-off prevention key 5a is to reach the groove 3c via the first group cam 3e and the connection groove 3f. During the paying out of the lens barrel, since the cam cylinder 3 rotates while the linear movement cylinder 5 is not rotated, the rotation and the rotational phase are set so that the coming-off prevention key 5a does not reach the connection groove 3f.

The second group lens-barrel unit 6 retains the second group lens while having a drive unit for a third group lens. Second group cam-followers 6a are studded and directed outside the second group lens-barrel 6 so as to engage with the second group cams 3d. The second group cams 3d are arranged at three circumferential positions at equal intervals, and the second group cam-followers 6a are also studded at three positions corresponding to each cam at equal intervals. Thereby, the second group lens-barrel unit 6 is uniquely supported. A second group linear-movement groove 5c made by cutting out the tubular shape of the linear movement cylinder 5 in parallel with the central axis of the fixed cylinder is engaged with the second group cam-followers 6a. Since the linear movement of the second group lens-barrel unit 6 is restricted by the linear movement cylinder 5 with these two engagements, the second group lens-barrel unit 6 can move in the axial direction of the fixed cylinder following the rotation of the cam cylinder 3 by profiling the second group cams 3d. In such a manner, the central axis of the fixed cylinder is arranged in parallel with the optical axis of the optical system.

A first group lens-barrel unit 7 retains the first group lens while having a function protecting lenses in a storing mode. A first group cam-followers 7a are studded and directed outside the first group lens-barrel unit 7 so as to engage with the first group cams 3e. The first group cams 3e are arranged at three circumferential positions at equal intervals, and the first group cam-followers 7a are also studded at three positions corresponding to each cam at equal intervals. Thereby, the first group lens-barrel unit 7 is uniquely supported. A linear movement receiver 7b is arranged substantially coaxially with the first group cam-followers. A first group linear-movement groove 5d made by cutting out the tubular shape of the linear movement cylinder 5 in parallel with the optical axis is engaged with the linear movement receiver 7b. Since the linear movement of the first group lens-barrel unit 7 is restricted by the linear movement cylinder 5 with these two engagements, the first group lens-barrel unit 7 can move in the optical axial direction following the rotation of the cam cylinder 3 by profiling the first group cams 3e.

The paying-out cams 2a, the first group cam 3e, and the second group cams 3d include a collapsible cam unit reducing the entire lens-barrel length to a minimum, a shooting cam unit for shooting, and a cam-connection unit connecting the collapsible cam unit to the shooting cam unit. The first group lens is payed out in parallel with the optical axis until the position of the paying-out cam 2a added to the first group cam 3e while the second group lens is payed out in parallel with the optical axis until the position of the paying-out cam 2b added to the second group cam 3d. In the shooting cam unit, the space between the first group lens and the second group lens is appropriately set so that the focal length is variable.

Figure 2:
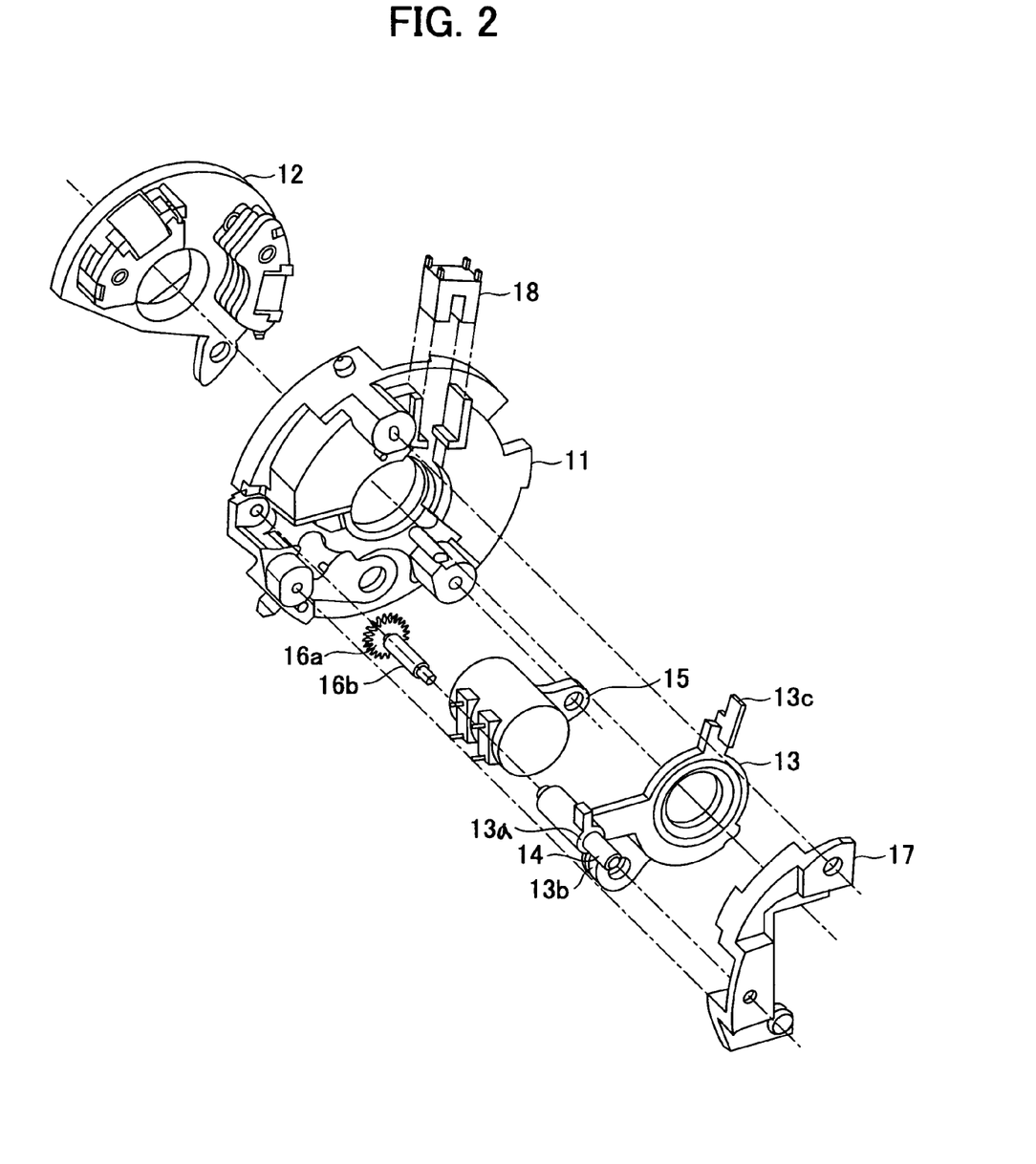
FIG. 2 is an exploded perspective view of a second group lens-barrel unit according to the embodiment.

Then, the structure of the second group lens-barrel unit 6 will be described in more detail. FIG. 2 is an exploded perspective view of the second group lens-barrel unit 6 when FIG. 1 is viewed in the reverse direction. A base board 11 has the second group cam-followers 6a so as to be a base of elements for driving a third group lens-barrel 13, which will be described later. A diaphragm shutter unit 12 having functions of a diaphragm and a shutter is fixed to the second group base board 11. A third group lens-barrel 13 retains the third group lens. A guide shaft 14 bar-shaped in parallel to the optical axis is studded in the second group base board 11. A guide hole 13a formed in the third group lens-barrel 13 is fitted to the guide shaft 14 so that the third group lens-barrel 13 is supported movably in the optical axial direction.

A step motor 15 is fixed to the second group base board 11. A gear 16a is rotated by a driving force of the step motor 15 transmitted by a connection gear (not shown). A screw 16b is rotated together with the gear 16a. A nut 13b, retained by the third group lens-barrel 13 not to rotate, is screwed with the screw 16b. A shaft retainer 17 for the screw 16b is fixed to the second group base board 11. Thereby, the rotation of the step motor 15 rotates the screw 16b via the gear 16a so as to move the third group lens-barrel in the optical axial direction.

A photo-interrupter (referred to as a PI below) 18 is fixed to the second group base board 11. A douser 13c is arranged at a predetermined position in the third group lens-barrel 13 so as to intersect the PI 18. When the third group lens-barrel 13 is driven, the position of the third group lens-barrel 13 is detected at first by the signal of the PI 18 so as to have an initial position. Since the distance per one step of the step motor 15 is known in advance, the position of the third group lens-barrel 13 can be known by counting the entered number of steps. Although not shown, electrical wiring to the step motor 15 and the PI 18 is connected outside the lens barrel using a flexible substrate.

Figure 3:
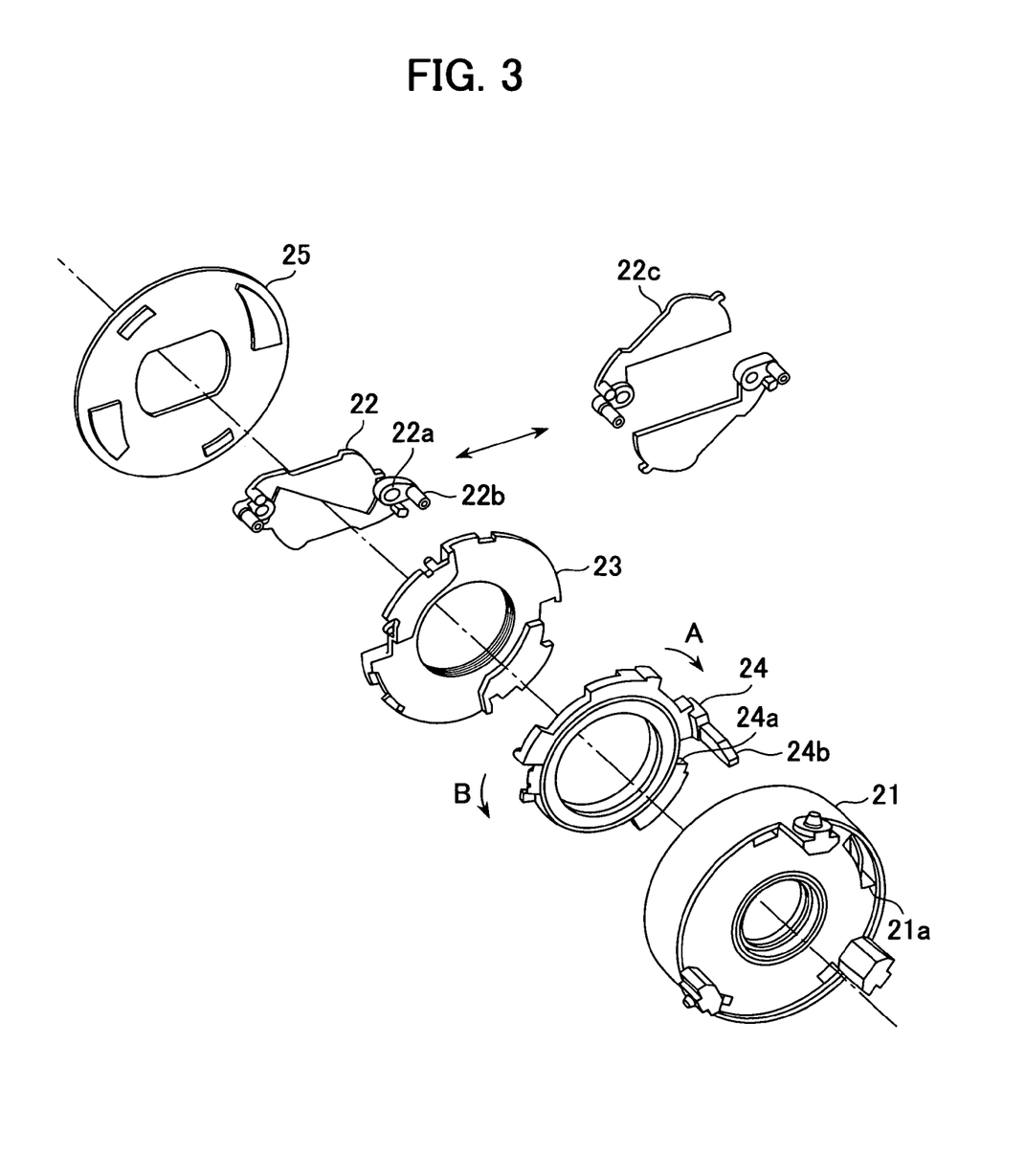
FIG. 3 is an exploded perspective view of a first group lens-barrel unit according to the embodiment.

Next, the structure of the first group lens-barrel unit 7 will be described in more detail. FIG. 3 is an exploded perspective view of the first group lens-barrel unit 7 when FIG. 1 is viewed in the reverse direction. A first group lens-barrel 21 has the first group cam-followers 7a and the linear movement receiver 7b so as to be a base of elements of a lens barrier, which will be described later. A lens barrier 22 protects lenses in the storing mode, and according to the embodiment, a pair of two lens barriers 22 is provided. The lens barrier 22 is provided with a rotational center 22a and a pin 22b, through which a rotational force is applied to the lens barrier 22. Reference numeral 22c denotes the lens barrier shown in an open area. To the lens barrier 22, an urging force is always applied in a closing direction by a spring (not shown). A barrier base board 23 is fixed inside the first group lens-barrel 21 so as to have a rotational shaft fitting into the rotational center 22a.

A barrier drive ring 24 rotates in a space between the barrier base board 23 and the first group lens-barrel 21 about the central shaft of the first group lens-barrel 21. Pushing the pin 22b by a portion 24a of the barrier drive ring 24 rotates the lens barrier 22 in the direction opening the lens barrier 22. To the barrier drive ring 24, an urging force is always applied in arrow B direction in FIG. 3 by a spring (not shown). This urging force is set to be larger than the urging force closing the lens barrier 22, so that in a state that an external force is not applied to the barrier drive ring 24, the portion 24a pushes the pin 22b so as to open the lens barrier 22. A decorative sheet 25 is fixed to the first group lens-barrel 21 for preventing the lens barrier 22 from coming off and improving the external appearance.

A barrier projection 24b having an inclined surface is studded in the barrier drive ring 24. Returning back to FIG. 1, a CCD base-board projection 1a abuts the barrier projection 24b in a transitional process of the lens barrel to a collapsed mode. When the lens barrel is moved to the collapsed mode, the inclined surface of the CCD base-board projection 1a first comes in contact with the inclined surface of the barrier projection 24b, and to the barrier drive ring 24, a pushing force toward an object and a rotational force in arrow A direction in FIG. 3 are applied. A force collapsing the lens barrel by a motor (not shown) is set larger than the urging force to the barrier drive ring 24 in arrow B direction, so that the barrier drive ring 24 rotates in arrow A direction by overcoming the urging force. Thereby, the pushing the pin 22b by the portion 24a is released so that the lens barrier 22 is closed by the urging force in the closing direction.

Next, an imaging-surface tilting mechanism will be described. It is difficult to assemble the optical system centrally based on the design because of eccentricity and inclination of lenses per se constituting the optical system and eccentricity and inclination of lens retainers. When the optical system is decentralized from the design in such a manner, the image plane of an object may not be necessarily orthogonal to the optical axis, i.e., there may be so-called field tilt. Also, the imaging surface of the CCD may not be necessarily parallel with the package surface but be oblique therewith, so that if the CCD is attached using the package surface as a reference, the inclination may be remained. By these two factors, if the center of the image plane is focused, two points across the center may be focally shifted in the direction reverse to each other. In order to solve this problem, a mechanism is required being capable of adjusting so as to focus on the entire region of the image plane as far as possible by tilting the image plane relative to the surface orthogonal to the optical axis. In order to solve this problem, the imaging-surface tilting mechanism is a mechanism for simultaneously correcting the field tilt and the CCD inclination.

Figure 4:
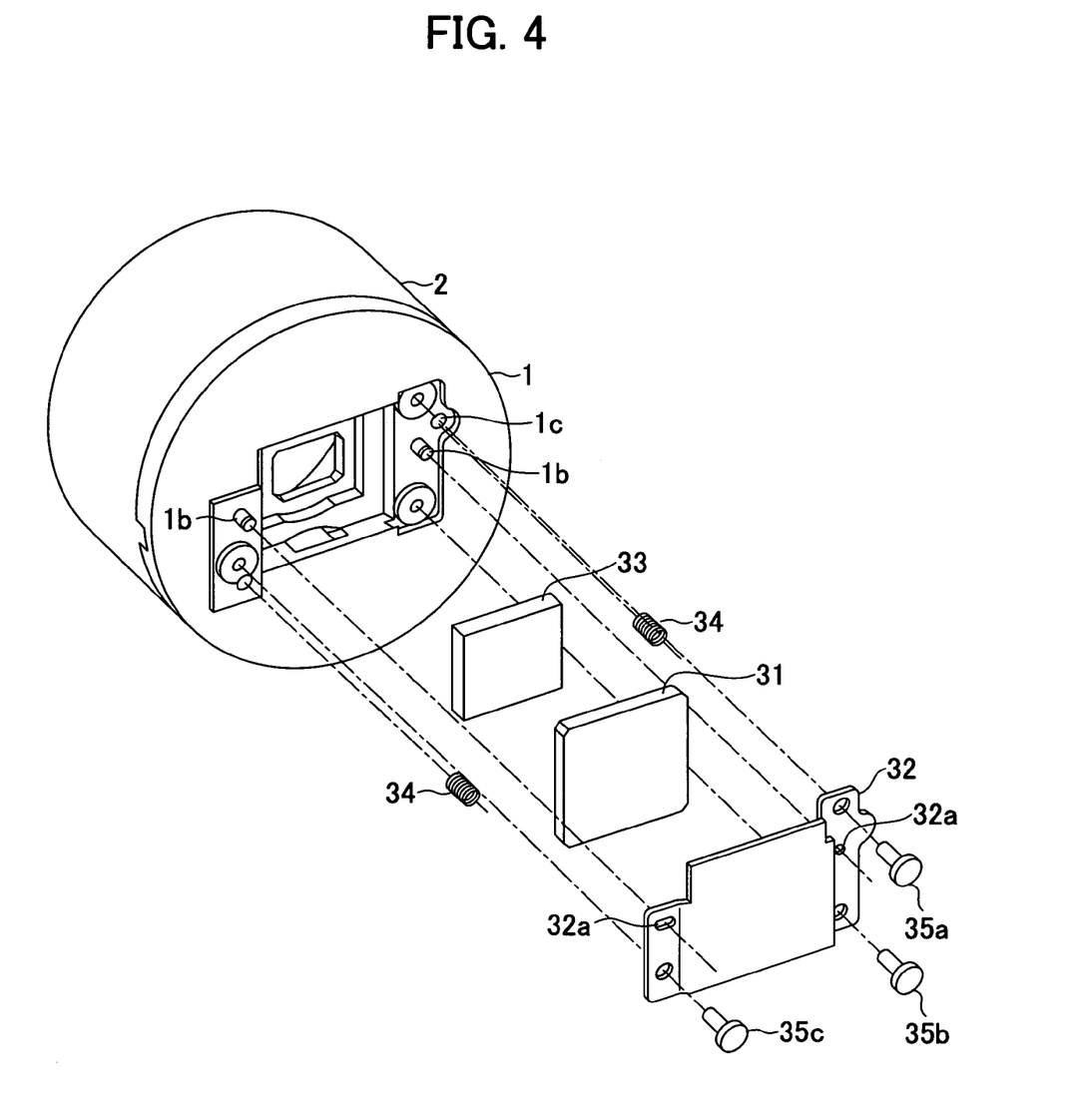
FIG. 4 is an exploded perspective view of an tilting mechanism of an image picking-up surface according to the embodiment.

FIG. 4 is an exploded perspective view of the imaging-surface tilting mechanism. A CCD 31 is provided with an image plane inside. The CCD 31 is bonded and fixed on a CCD retaining plate 32. Holes 32a formed in the CCD retaining plate 32 are fitted with pins 1b studded in a CCD base board 1 with a very small clearance so as to define the image plane position on the surface orthogonal to the optical axis relative to the CCD base board 1. An optical LPF 33 prevents a luminance moiré and a false color using birefringence of crystal during shooting an object having a repetition pattern.

Holes 1c with bottoms are formed in the CCD base board 1. Compression springs 34 are loosely fitted into the holes 1c. The compression springs 34 are sandwiched between the CCD base board 1 and the CCD retaining plate 32, so that a separating force from the CCD base board 1 is applied to the CCD retaining plate 32. Adjustment screws 35a, 35b, and 35c are screwed with the CCD base board 1 for pushing the CCD retaining plate 32 to be separated by the compression springs 34 to the CCD base board 1.

Figure 5:
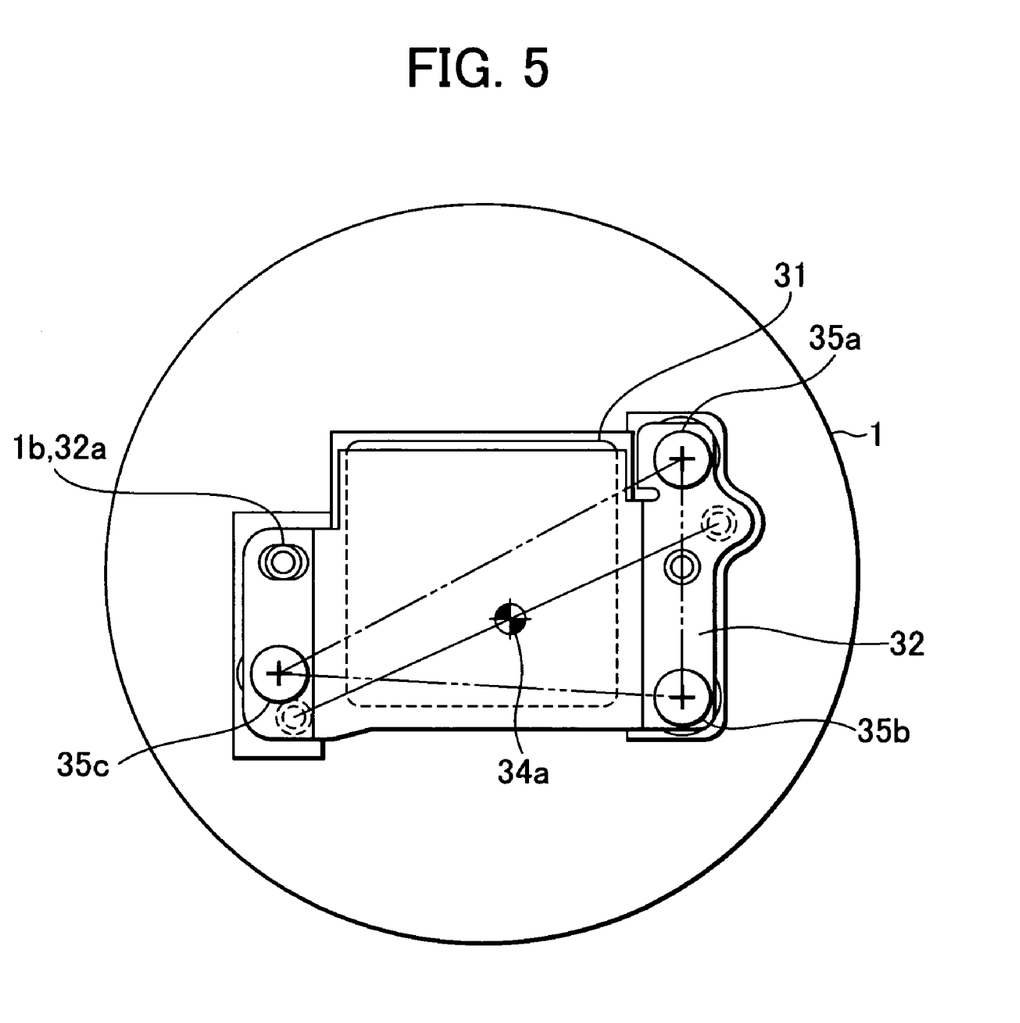
FIG. 5 is a rear view of the tilting mechanism of the image picking-up surface according to the embodiment.

FIG. 5 is a rear view of the imaging-surface tilting mechanism, and the tilting adjustment of the imaging surface will be described with reference to the drawing. Wherein, reference numeral 34a denotes a resultant force from the two compression springs 34, which will be located at substantially the intermediate position between the two springs if the spring characteristics and the amount of compression are the same. First, an object with a certified flat surface is shot several times while shifting focus so as to grasp the inclination of the image plane by monitoring changes in sharpness of image signals. Next, the imaging surface is tilted so as to eliminate the inclination of the image plane by appropriately and respectively rotating three adjustment screws.

For example, when the adjustment screw 35b is rotated, since to the CCD retaining plate 32, the resultant force 34a of the compression springs is applied, the CCD retaining plate 32 can be freely tilted about the line connection between the adjustment screws 35a and 35c as an axis. If the adjustment screws 35a and 35c are completely tightened, the CCD retaining plate 32 cannot be tilted, so that the screws are in a loosened state by a predetermined amount, and the heights of the screw swivel plates of the CCD base board 1 are set so that the imaging surface is centered in design in the loosened state by a predetermined amount. If the line connecting the adjustment screws 35b and 35c is supposedly sandwiched by the resultant force 34a and the adjustment screw 35b therebetween, the pushing force to the CCD base board 1 is always applied to the adjustment screw 35b of the CCD retaining plate 32, so that the adjustment is incapable. That is, in order to be capable of tilting in any directions, the resultant force of compression springs must be located within a triangle connecting three adjustment screws. According to the embodiment, two compression springs are used; alternatively, any number of sprigs may be used as long as the resultant force of compression springs is located within a triangle connecting three adjustment screws. Moreover, the closer the distance between the gravity center of the triangle connecting three adjustment screws and the resultant force of the compression springs, the better the adjustment work efficiency becomes.

Similarly, by the rotation of the adjustment screw 35a, the CCD retaining plate 32 is tilted about the line connecting between the adjustment screws 35b and 35c as an axis; and by the rotation of the adjustment screw 35c, tilted about the line connecting between the adjustment screws 35a and 35b as an axis. Since the heights of three adjustment screws can define the surface inclination, at least three adjustment screws are required. In addition, the hole 32a is fitted with the pin 1b with a small clearance so that the CCD retaining plate 32 can be tilted.

Next, the arrangement of components for reducing the entire length of the lens barrel in the collapsed mode while reducing the diameter of the lens barrel as small as possible will be described. In order to reduce the entire length in the collapsed mode, it is essential to have the second group lens-barrel unit 6 access to the CCD base board 1 as closer as possible. At this time, the CCD base board 1 is provided with elements protruding toward an object and not protruding toward the object, such as the CCD 31 as an imager, the optical LPF 33, and elements for the imaging-surface tilting mechanism such as the compression springs 34 and the adjustment screws 35a, 35b, and 35c. Therefore, it is preferable that the elements on the second group lens-barrel unit 6 be arranged so as to avoid protruded portions of the CCD base board 1 viewed head on.

If the entire length of the lens barrel is simply reduced, the displacement of the cam cylinder 3 is reduced in the optical axial direction, so that the lens groups cannot be payed out until predetermined positions. Therefore, the cam cylinder 3 is required to construct so as to drop toward the imaging surface in the collapsed mode. To do so, in order to avoid portions protruded from the CCD base board 1, it is preferable to fit the cam cylinder 3 outside the protruded portions. In practice, since the linear movement cylinder 5 is fitted into the cam cylinder 3, it is preferable that the internal surface of the linear movement cylinder 5 be supported with small clearances to the protruded portions of the CCD base board 1.

Figure 6:
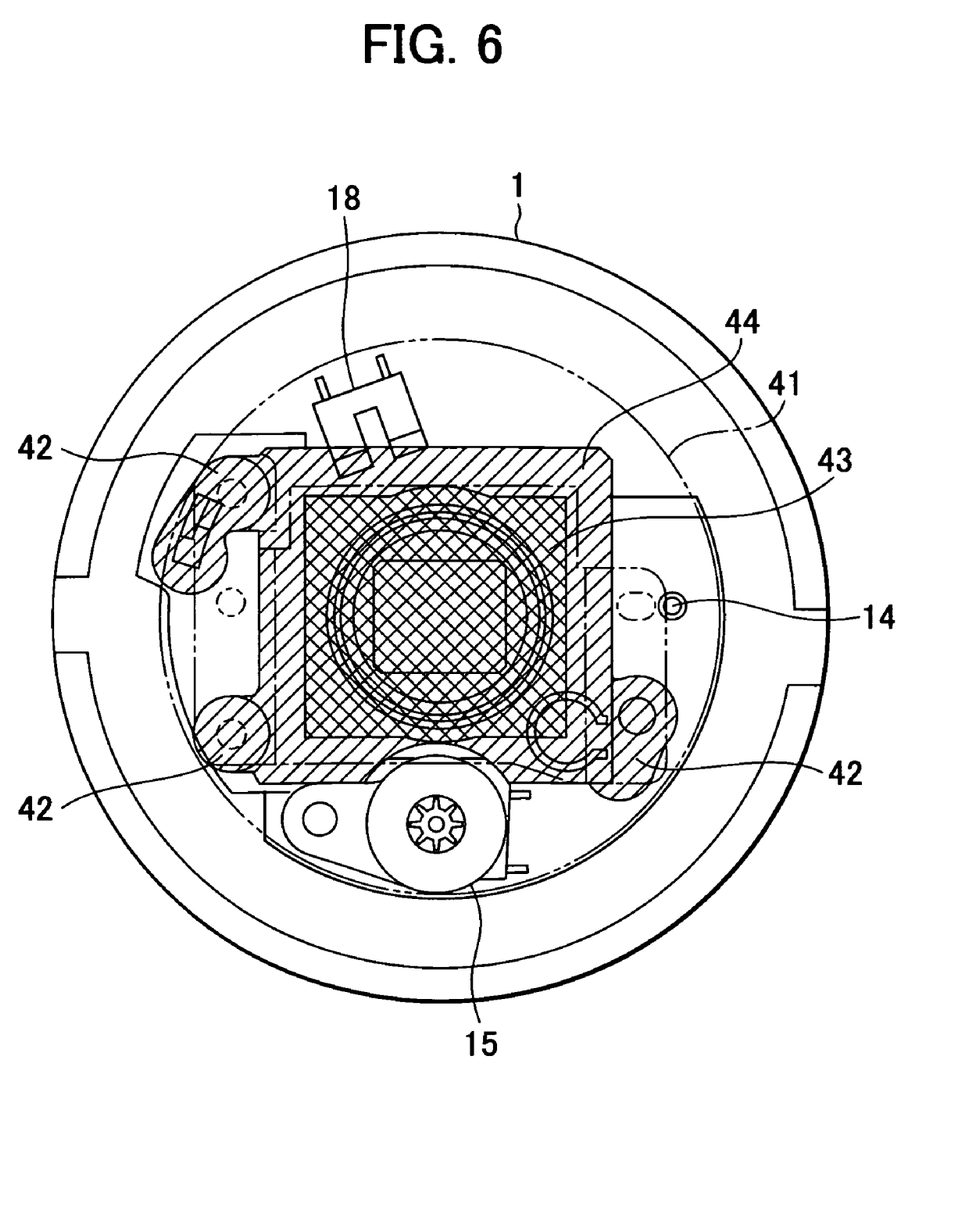
FIG. 6 is a front view of an arrangement of components of the second group lens-barrel according to the embodiment.

FIG. 6 is a front view of the elements for driving the third group lens-barrel 13 and the CCD base board 1. A containment circle 41 is for substantially containing the imaging-surface tilting mechanism. A first projection 42 is composed of protruded portions such as the hole 1c with a bottom of the imaging-surface tilting mechanism and the adjustment screws 35a, 35b, and 35c. Similarly, a second projection 43 of the optical LPF 33; and a third projection 44 of the CCD 31. As shown in FIG. 6, the guide shaft 14 and the step motor 15 are arranged so as to avoid the entire projections. The longer guide shaft 14 can have a longer fitting length with the third group lens-barrel 13 so as to reduce the tilting due to fitting clearance. The longer step motor 15 can reduce the current consumption pre output. When elements of the second group lens-barrel are arranged so as to avoid the projections in such a manner, the lens barrel can be miniaturized without reducing the performance.

The PI 18 avoids the first and second projections 42 and 43; however it intersects the third projection 44. The reason is that the PI 18 is small per se and if it were jumboized, the function cannot be improved so that it is not necessary to avoid the entire projections against reason. By doing so, the PI 18 can be arranged within the containment circle 41. There are no projections outside the containment circle 41, and the elements constituting the second group lens-barrel are contained therein considering characteristics of each element, so that the cam cylinder 3 and the linear movement cylinder 5 can be collapsed until the bottom surface of the CCD base board 1. Also, the CCD base board projection 1a is arranged so as to overlap the first projection 42 composed of the imaging-surface tilting mechanism, so that the projections for driving the barrier are arranged without enlarging the area of the projections viewed from the front surface.

Figure 7:
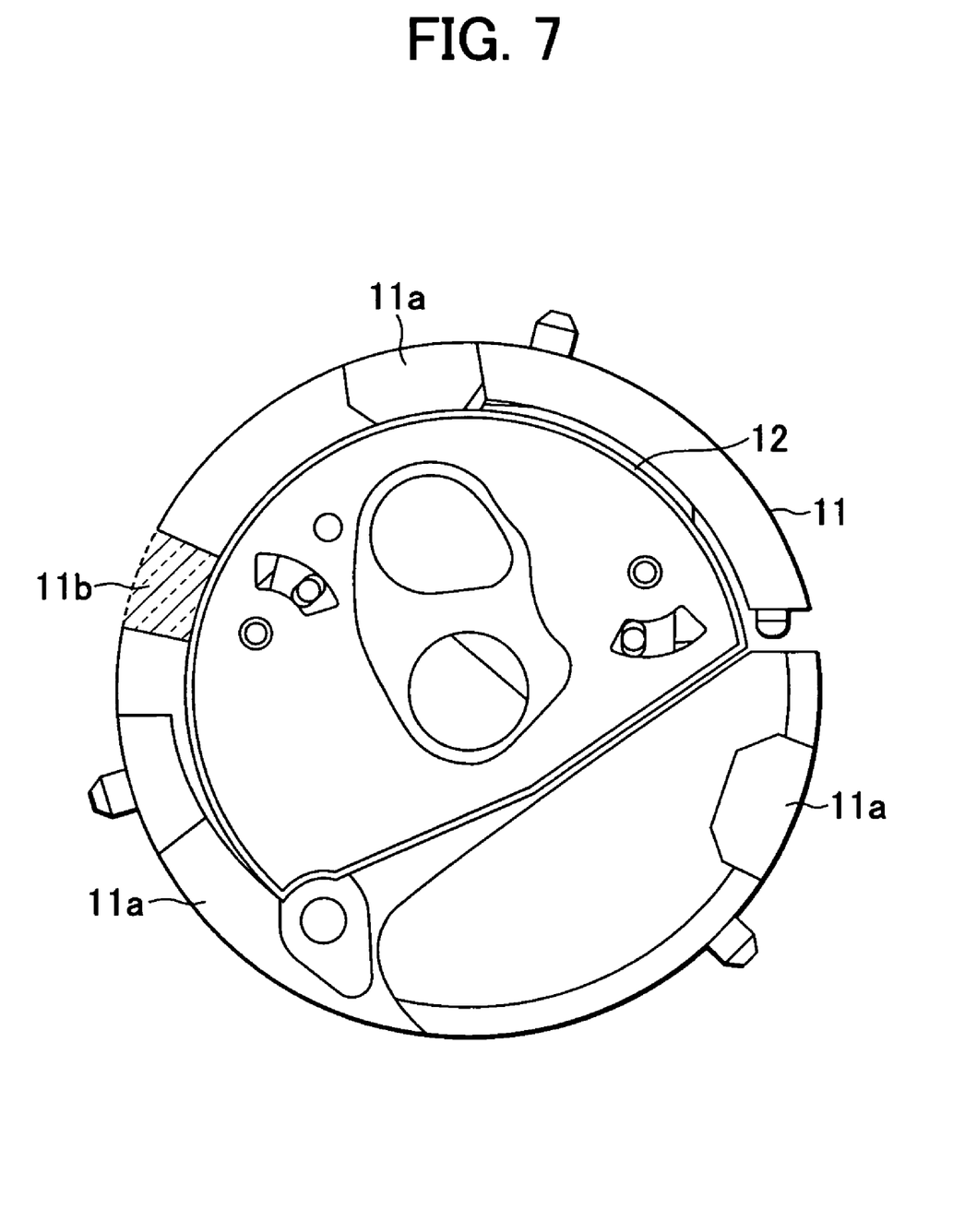
FIG. 7 is a front view of a second group base board according to the embodiment.

Next, the relationship between the arrangement of elements of the second group lens-barrel unit 6 and the second group base board 11 will be described. FIG. 7 is a front view of the second group base board 11 and the diaphragm shutter unit 12. Since elements for driving the third group lens-barrel 13 are mounted on the second group base board 11 itself, the cut-out portion is not necessary for driving the third group lens-barrel 13 as in the conventional lens-barrel. Reference numeral 11a denotes recesses for avoiding the first group cam-followers 7a; and the conventional lens-barrel is cut out as shown by reference numeral 117 of FIG. 10. According to the embodiment, since the elements for driving the third group lens-barrel 13 are not mounted on the CCD base board 1, there is a space between the second group base board 11 and the CCD base board 1 in the collapsed mode, so that the cut-out for avoiding the first group cam-followers 7a is capped using the space so as to have the recess.

A cut-out 11b is for avoiding the CCD base board projection 1a. As mentioned above, since the CCD base board projection 1a directly abuts the barrier projection 24b, the second group base board 11 need to be cut out. However, the cut-out of the second group base board 11 is smaller than that of a conventional one, so that the strength of the second group base board can be maintained large so as to improve the retaining accuracy for the second group lens, leading to improved optical performance by suppressing fluctuation due to zooming. Also, in the past, light passing through the cut-out of the second group lens-barrel unit directly entered the imaging surface so as to produce ghost images or flare due to irregular reflection between the imaging surface and the second group lens-barrel unit; however, the second group lens-barrel unit according to the embodiment can largely suppress the ghost images and flare.

Moreover, in a conventional structure, if the movable range of the third group lens-barrel is increased, even the first group lens-barrel 110 must be cut-out, so that elements constituting the lens barrier are difficult to be arranged; however, according to the embodiment, this difficulty can be alleviated. Also, the third group lens cannot be physically moved toward an object beyond the entire lens-barrel length in the collapsed mode, constraining to reduce the entire lens-barrel length; however, according to the embodiment, the constraints can be alleviated.

In the image pick-up apparatus according to the present invention described above, the entire lens-barrel length and the lens-barrel diameter can be reduced while improving optical performance without sacrificing the lens barrier mechanism built in the lens-barrel.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitute the invention.

Further, the storage medium, such as a floppy disk, a hard disk, an optical disk, a magneto optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium stores program codes corresponding to the flowcharts described in the embodiments.

The present invention is not limited to the above embodiments and various changes and modifications can be made within the sprit and scope of the present invention. Therefore to apprise the public of the scope of the present invention, the following claims are made.

What is claimed is:

1. An imaging system comprising:
   a holding unit holding an image picking-up device that receives light from a subject and generates a signal;
   a motor configured to drive a driven member, the motor being arranged to overlap with the holding unit as viewed from the subject side, closer to the subject side than the holding unit and movable relatively to the holding unit in the direction of an optical axis; and
   a bar-shaped guide member guiding a guided member, the guide member being positioned in a quadrant next to a quadrant where the motor exists and arranged to overlap with the holding unit as viewed from the subject side, closer to the subject side than the holding unit and movable relatively to the holding unit in the direction of the optical axis,
   wherein the holding unit includes an overhang portion holding the image picking-up device in the direction of the subject side on the optical axis, and the motor and the guide member are arranged so as to avoid the overhang portion in the direction perpendicular to the optical axis when the motor and the guide member come relatively close to the holding unit and reach a position where the motor and the guide member overlap with the overhang portion.

2. An imaging system according to claim 1, wherein the holding unit includes a tilting unit tilting an imaging surface of the image picking-up device, and wherein the motor and the guide member are arranged within a cylinder substantially containing the tilting unit so as to avoid the overhang portion in the direction perpendicular to the optical axis when the motor and the guide member come relatively close to the holding unit.

* * * * *